United States Patent [19]
Mieger

[11] Patent Number: 5,438,772
[45] Date of Patent: Aug. 8, 1995

[54] TOOL FOR IMPLEMENTS

[76] Inventor: Rolf Mieger, Fellheimer Weg 23, 7951 Kirchdorf/Iller, Germany

[21] Appl. No.: 92,596

[22] Filed: Jul. 16, 1993

[30] Foreign Application Priority Data

Jul. 31, 1992 [DE] Germany .......................... 9210292 U

[51] Int. Cl.⁶ ............................................... E02F 3/96
[52] U.S. Cl. .......................................... 37/406; 37/403; 37/409
[58] Field of Search ............... 37/406, 403, 461, 184, 37/187, 408, 409, 410; 294/104, 106, 3

[56] References Cited

U.S. PATENT DOCUMENTS

| | | | |
|---|---|---|---|
| 3,165,347 | 1/1965 | Keskitalo | 294/104 X |
| 3,590,894 | 7/1971 | Boyd et al. | 294/106 X |
| 4,248,471 | 2/1981 | La Bounty | 294/106 X |
| 4,519,135 | 5/1985 | LaBounty | 37/406 |
| 4,703,968 | 11/1987 | LaBounty | 294/106 X |
| 4,838,493 | 6/1989 | La Bounty | 241/101.7 |
| 4,951,886 | 8/1990 | Berto | 241/101.7 |
| 5,060,378 | 10/1991 | La Bounty et al. | 30/134 |
| 5,062,227 | 11/1991 | DeGier et al. | 37/406 |
| 5,273,217 | 12/1993 | Bartels et al. | 241/30 |
| 5,301,882 | 4/1994 | Morikawa et al. | 241/101.7 |

FOREIGN PATENT DOCUMENTS

2071053 9/1981 United Kingdom .

*Primary Examiner*—Randolph A. Reese
*Assistant Examiner*—Victor Batson
*Attorney, Agent, or Firm*—Harness, Dickey & Pierce

[57] ABSTRACT

A tool for mounting on an implement, in the case of which different functional working ranges are provided with which respectively separate operations are able to be performed. In order to create a multi-purpose tool of this type which at the same time has a high degree of strength and a long working life while making possible efficient operation, the tool has, in accordance with the invention, a center part, whose lateral flanks each constitute a part of the working tool, two lateral parts pivotally mounted on the center part which respectively constitute the other parts of the working tool, and at least one piston and cylinder unit for pivoting the lateral part in relation to the center part and locking elements, with which respectively one lateral part may be locked in relation to the center part.

17 Claims, 6 Drawing Sheets

TOOL FOR IMPLEMENTS

BACKGROUND OF THE INVENTION

I. Field of the Invention

The invention relates to a tool for use with implements and having different functional working ranges with which respectively different working operations can be performed.

Such tools may be mounted as fixtures on implements such as hydraulic excavators, hydraulic cable excavators, or the like.

II. Description of the Prior Art

Demolition tools or concrete crushers have been proposed as tools on implements, which have different designs. While known demolition tools are able to completely break up the concrete itself, they are not able to sever or are not able to completely sever the reinforcement material. Such reinforcements or supports in the concrete then have to be cut using a torch or a scrap cutter. In the case of the use of a scrap cutter it is necessary for the implement to be suitably modified.

However, concrete crushers have been proposed having in their neck portion a sort of small shears whose function is however by no means sufficient to ensure trouble-free performance of operations. In order to improve upon this manner of operation, concrete crusher shears have been developed which in the front third of the shears part are able to break concrete and have provided in the rear two thirds the reinforcement cutting shears. For this purpose the rear two thirds of the concrete cutting shears are designed in the form of knife shears. However, when using such a combined tool the knife part is also in engagement when breaking concrete so that it is also subject to a high wear rate. Furthermore there is the disadvantage of there only being a poor breaking action, since this function has, in fact, to be performed by the first third of the arm.

SUMMARY OF THE PRESENT INVENTION

One object of the present invention is to provide a tool of the type initially mentioned so improved that it may be multifunctionally employed and at the same time has a high degree of strength and a long working life. Such a tool is efficient in use in, for instance demolition operations.

Taking as a starting point a tool of the sort noted initially this object is to be attained by the features of the preferred embodiment of the present invention. According to this embodiment the tool has a center part, whose lateral flanks respectively constitute a part of the working tool. On the center part two lateral parts are pivotally attached, which respectively constitute the other parts of the working tool. The lateral parts are able to be pivoted in relation to the center part by means of at least one hydraulically actuated piston and cylinder unit. In addition, locking elements are provided by means of which respectively one lateral part may be locked in relation to the center part when such part is not needed during the particular working operation of the tool. The essential advantage of the tool in accordance with the invention is that one hydraulic cylinder is able to be employed for two tools and that the supporting action of the tool arm which is not functioning entails a substantially lower load on the center part of the tool. Therefore it is possible for the operational weight of the dual-function tool to be in a range, which is not essentially greater than the weight range of a plain tool. The forces entailed on opening the tool are taken up by means of corresponding locking elements, as for example locking, pins or catches. Other embodiments of the tool in accordance with the invention are set forth below.

Thus it is possible to design a combination tool with the following preferred pairs of tool elements:
A gripping tongs and an alligator shears
A concrete pulverizer and a concrete crusher
A vulture beak shears and an alligator shears
A timber cleaver and a timber cutter
A concrete breaker and a shears Further advantageous developments and convenient forms of the invention will be understood from the following detailed descriptive disclosure of embodiments thereof in conjunction with the accompanying drawings.

BRIEF DESCRIPTION OF THE DRAWINGS

The present invention will be more fully understood by reference to the following detailed description of the preferred embodiments when read in conjunction with the accompanying drawings in which like reference characters refer to like parts throughout the view, and in which.

DETAILED DESCRIPTION OF THE PREFERRED EMBODIMENTS OF THE PRESENT INVENTION

The drawings disclose the preferred embodiments of the present invention. While the configurations according to the alternate configurations of the present invention may be adopted without deviating from the invention as portrayed. The preferred embodiments are discussed hereafter.

Figure 1:
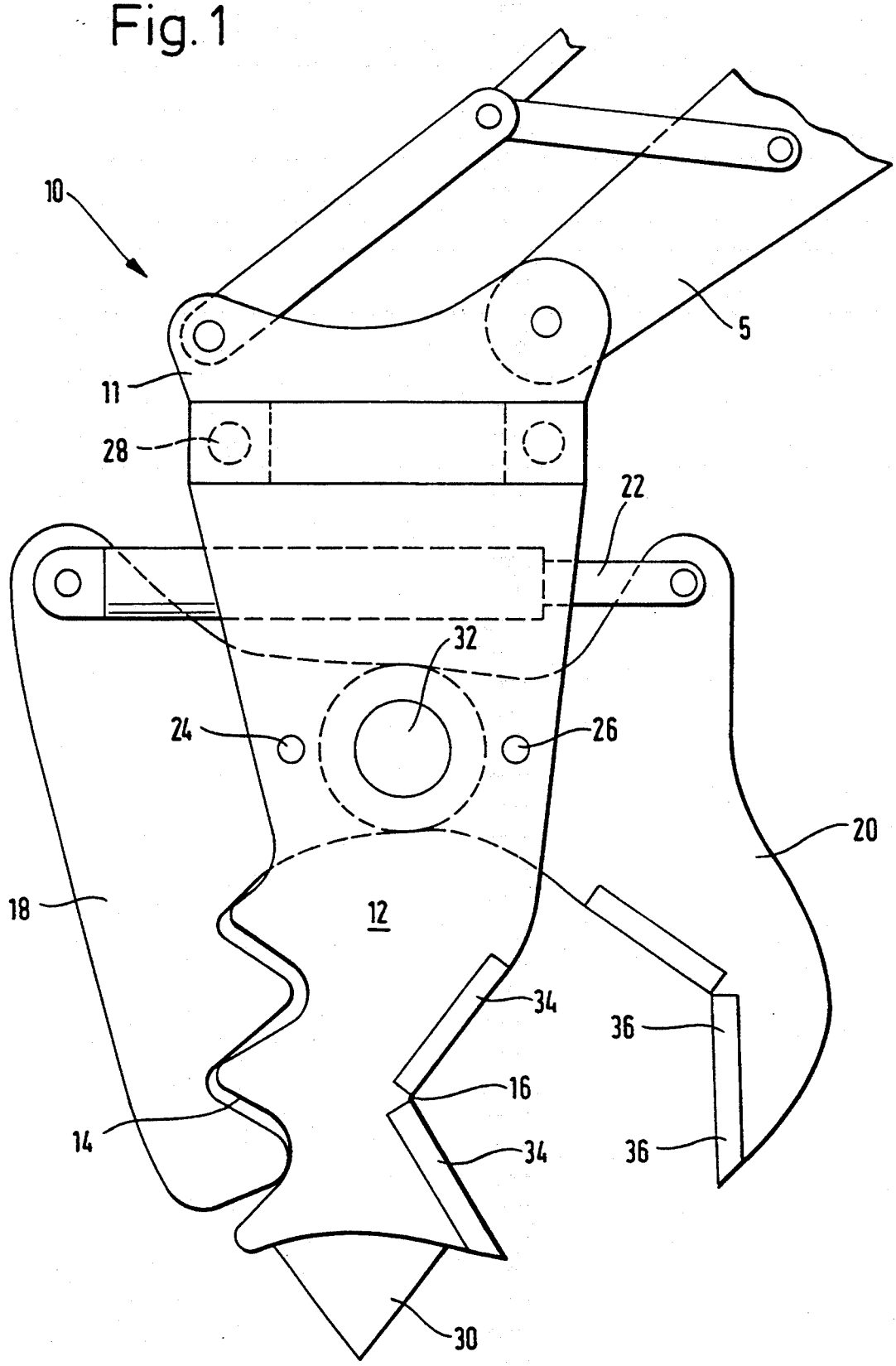
FIG. 1 is a diagrammatic elevation of a first working embodiment of the tool in accordance with the invention as seen from the side.

In FIG. 1 the reader will see a first working embodiment of the tool 10 in accordance with the invention, which is pivoted via a suitable connecting member 11 on a excavator arm 5 in an inherently known manner. The tool 10 comprises a center part 12 or jaw whose lateral flanks 14 and 16 respectively constitute a part of a working tool. Lateral parts 18 and 20 or jaws cooperate with these lateral flanks 14 and 16, such lateral parts 18 and 20 each constituting another part of the working tool. The lateral parts 18 and 20 are pivotally mounted on a pin 32. The pivotal movement is caused by a piston and cylinder unit 22 which respectively acts on the lateral parts 18 and 20 in the manner illustrated in FIG. 1. In this respect, during pivotal motion one respective lateral part 18 or, respectively, 20 is able to be locked in relation to the center part by means of locking elements 24 and, respectively, 26 with the result that only one respective lateral part is pivoted outwards.

The center part is rotatably connected with the mounting part 11 by means of a collar 28. Accordingly, it is possible for the tool to be turned in relation to its center plane through 360° in a manner not illustrated here. A hydraulic or an electrical drive (not shown) may be employed to operate the tool 10. In the working embodiment in accordance with FIG. 1 the center part has, in addition, a spike 30.

Figure 2:
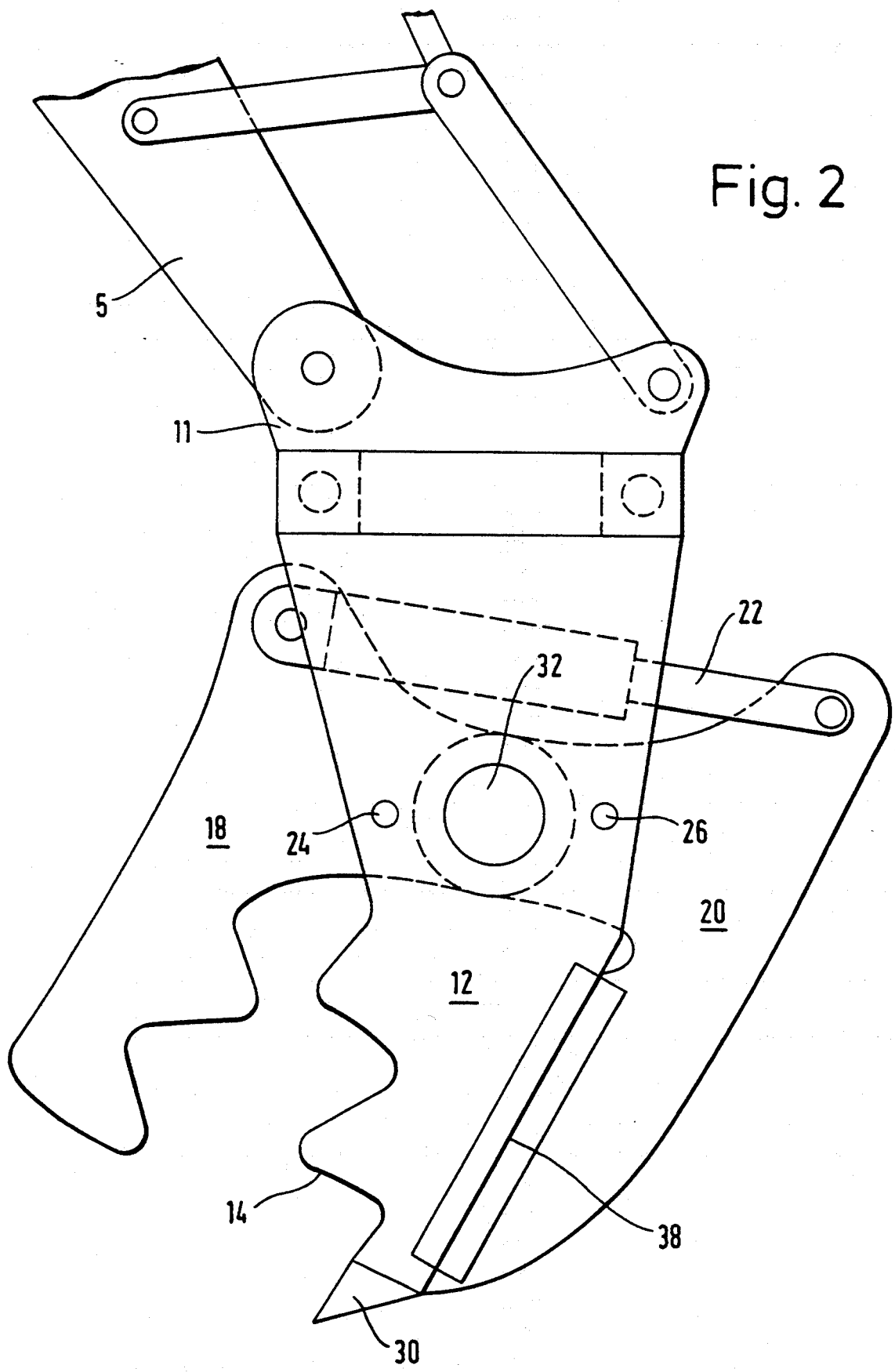
FIG. 2 shows the working embodiment in accordance with FIG. 1 in a different working position.

In the working embodiment illustrated in FIG. 1 the lateral part 18 together with the lateral flank 14 of the center part constitutes a concrete crusher member. The lateral flank 16 with the lateral part 20 constitutes a scrap cutter. For this purpose the lateral flank 16 and the lateral part 20 have corresponding cutting reinforcements 34 and 36, respectively. While in FIG. 1 the concrete crusher part is shown to be locked in relation to the center part 12 by means of the locking element 24, the shears part is moved open by the piston and cylinder unit 22, that is to say the lateral part 20 is moved open to its position. In FIG. 2 the lateral part 18 is shown in its open position, whereas the lateral part 20 is locked in relation to the center part by means of the locking element 26. In this working embodiment the cutting range or section 38 of the shears part is slightly modified to depart from the design in accordance with FIG. 1 so that there is provided a further possible modification of the configuration of the tool.

Figure 3:
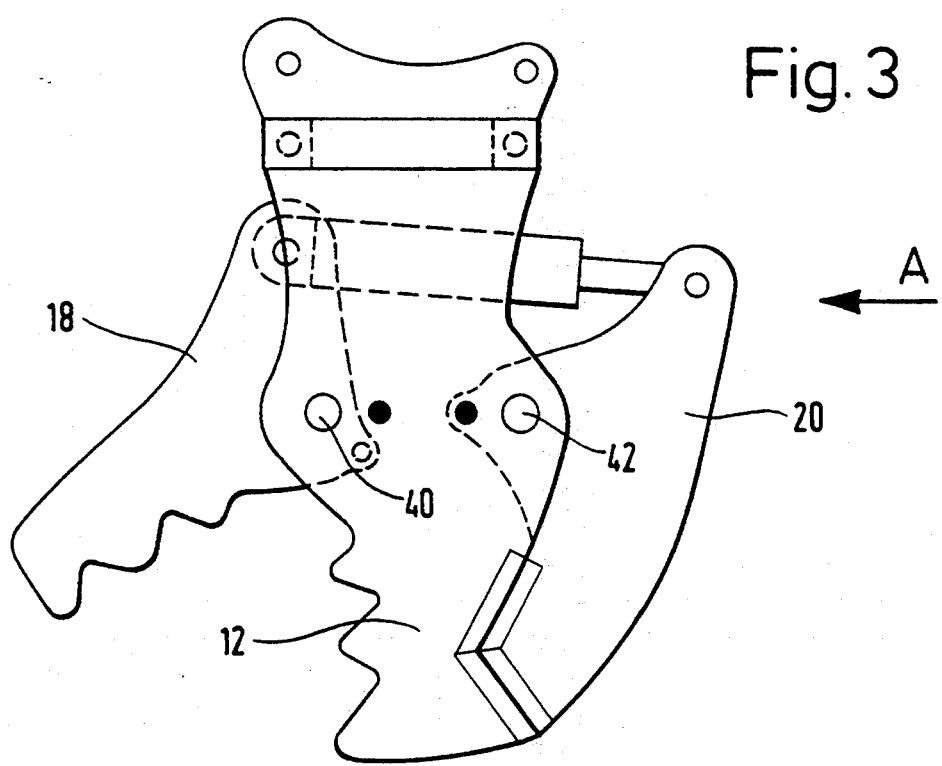
FIG. 3 shows a second working embodiment of the tool in accordance with the invention in a diagrammatic lateral elevation.
Figure 4:
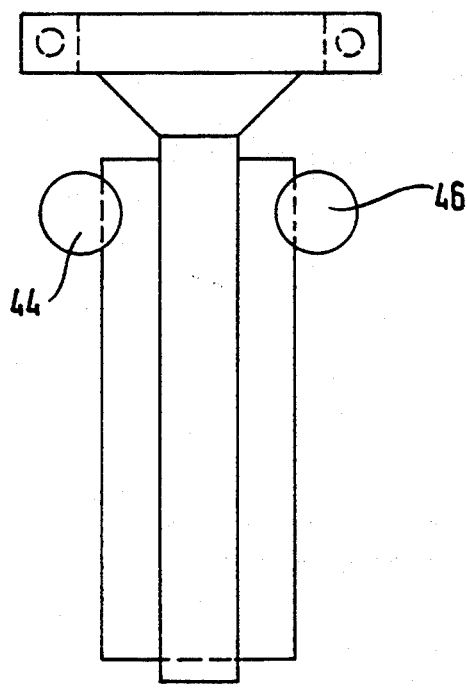
FIG. 4 and FIG. 5 respectively show diagrammatic elevations of modifications of the working embodiment in accordance with FIG. 3 as seen in the direction A of the arrow in FIG. 3.
Figure 5:
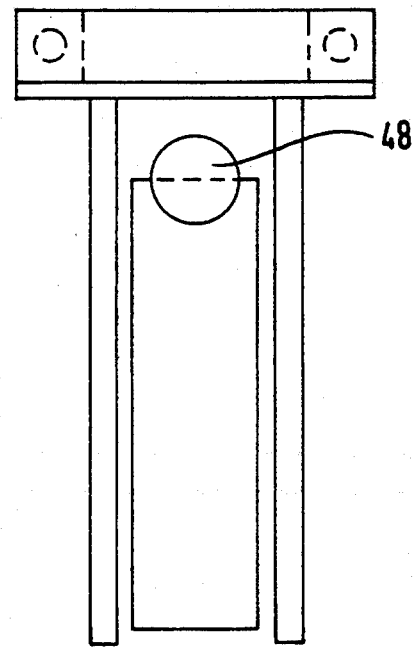

In the working embodiment in accordance with FIG. 3 the lateral parts 18 and 20, respectively, are mounted on the center part by means of separate bearing pins 40 and 42. In other respects this working embodiment is the same as the working embodiment already described in the above. The FIGS. 4 and 5 indicate different possible configurations of the piston and the cylinder unit in the case of a design in accordance with FIG. 3. The working embodiment in accordance with FIG. 4 have two piston and cylinder units 44 and, respectively, 46 extending in parallelism, whereas FIG. 5 shows a centrally arranged piston and cylinder unit 48.

Figure 6:
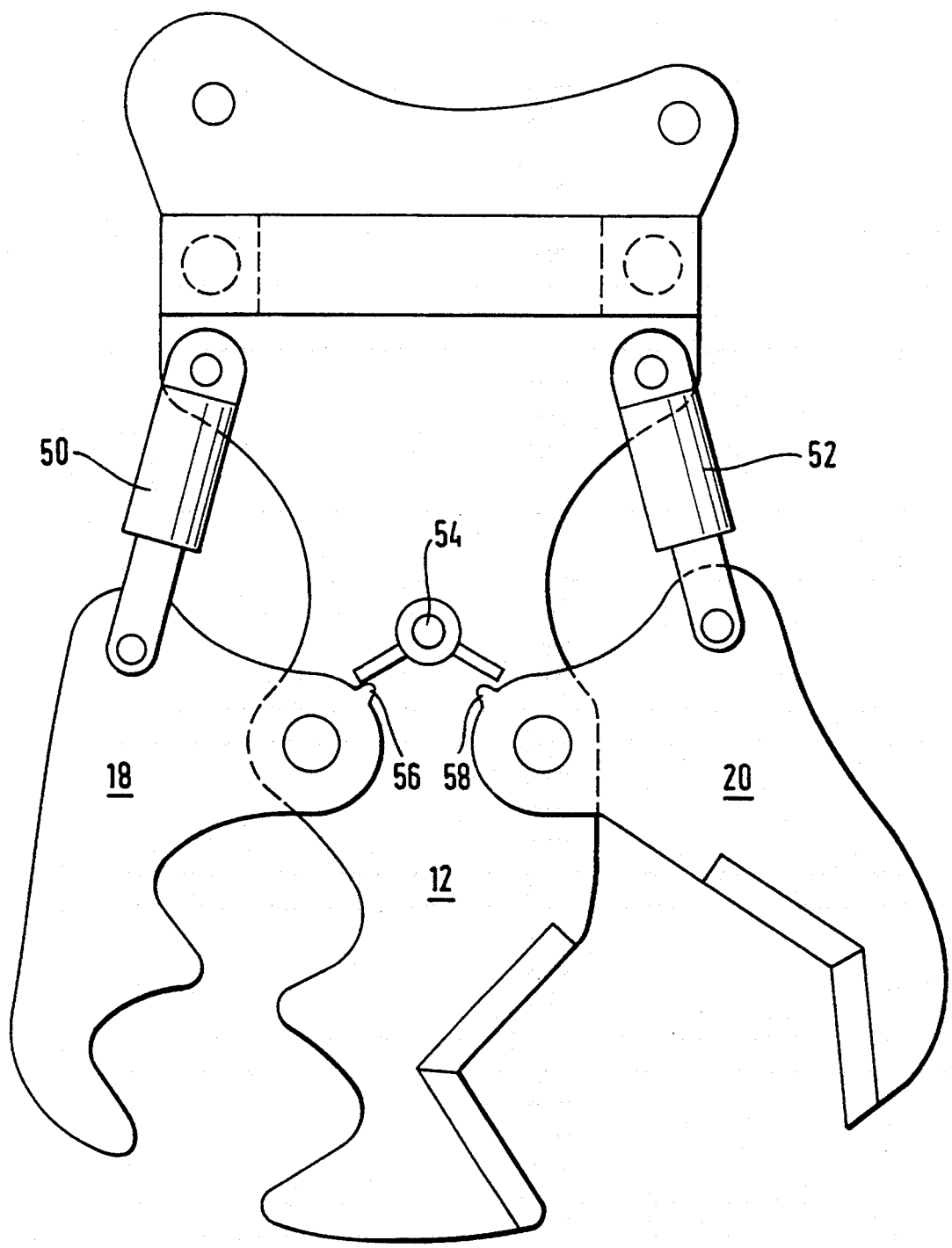
FIG. 6 shows a further possible working embodiment of the tool in accordance with the invention.
Figure 9:
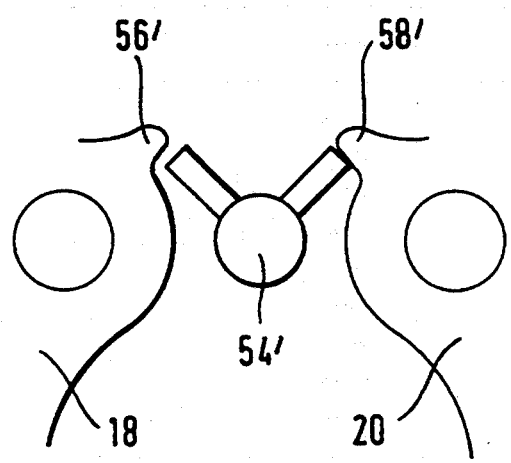

In the working embodiment in accordance with FIG. 6, separate piston and cylinder units 50 and 52 are provided for pivotal movement of the lateral parts 18 and 20. In this case the piston and cylinder unit 50 is provided between the lateral part 18 and a pivot point on the center part 12, whereas the piston and cylinder unit 52 is arranged between the lateral part 20 and a corresponding pivot point on the center part 12. Reference numeral 54 denotes a pivoting catch, which constitutes a locking element. The latter cooperates by means of respective projections or teeth 56 and 58 with the lateral parts 18 and 20. FIG. 9 is a detailed view of a corresponding catch 54', which is slightly modified and cooperates with the projections 56' and 58' of the lateral parts 18 and 20, respectively.

Figure 7:
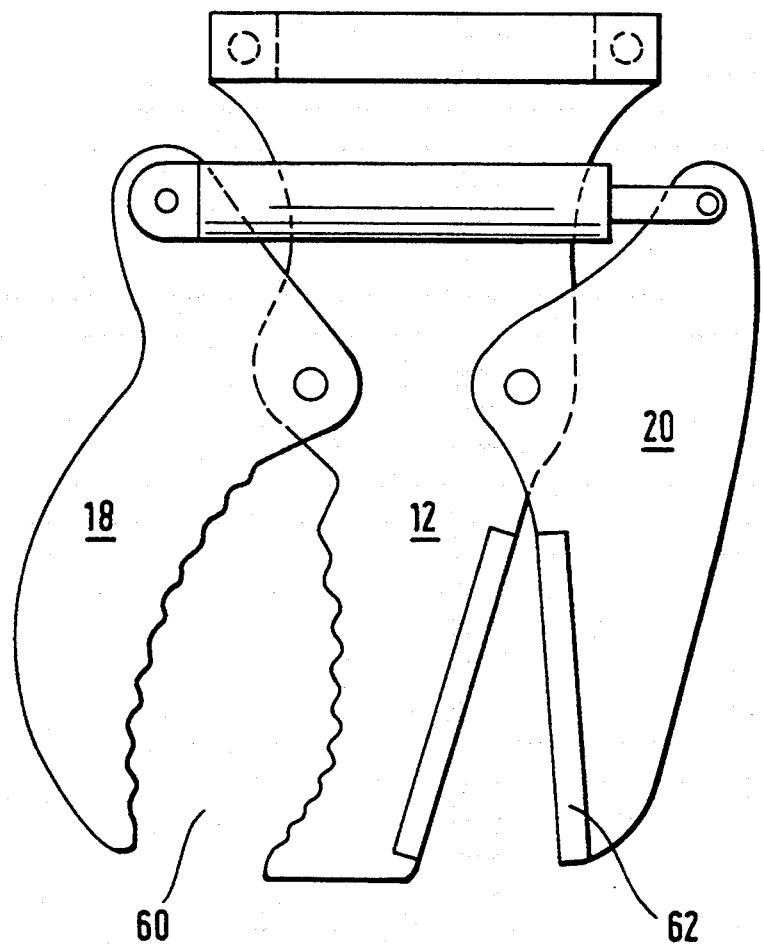
FIG. 7 shows a simplified representation of the tool in lateral elevation.

In FIG. 7 a further working embodiment of the tool in accordance with the invention is illustrated. In this case, one portion of the tool is designed in the form of a gripping tongs 60 and one further part is designed as an alligator shears 62. In a manner which is not illustrated it is furthermore possible for other combinations to be obtained, such as the following ones.

A concrete crusher and a concrete pulverizer

Figure 8:
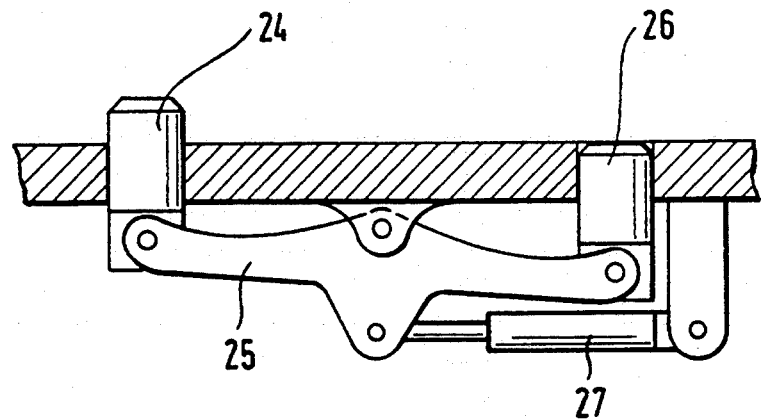
FIG. 8 and FIG. 9 show details of the jaw closing device.

A vulture beak-shaped shears with a small opening for girders and an alligator shears with a large opening for sheet metal A timber cleaver and a timber cutter Lastly, FIG. 8 shows a detail of the bolt or pin locking device. The pins 24 and 26 are able to be hydraulically pivoted inwards and outwards using a bell crank 25 driven by a piston and cylinder unit 27.

Having described my invention, however, many modifications thereto will become apparent to those skilled in the art to which it pertains without deviation from the spirit of the invention as defined by the scope of the appended claims.

I claim:

1. A tool for use with implements and having different functional working ranges with which respectively different working operations can be performed, characterized by;
   a center part, whose lateral flanks respectively constitute the one part of the working tool,
   two lateral parts pivotally mounted on the center part and which respectively constitute the other parts of the working tool,
   at least one piston and cylinder unit for pivoting the lateral parts in relation to the center part, and
   locking elements, by means of which one lateral part may be locked in relation to the center part,
   said locking elements including a center locking part attached to said center part, a first lateral locking part attached to one of said two lateral parts and a second lateral locking part attached to the other of said two lateral parts, said locking elements operating such that only one or the other of said two lateral locking parts is operable at a single time.

2. The tool as claimed in claim 1, characterized in that it is rotatably carried by a collar on a mounting member.

3. The tool as claimed in claim 1, characterized in that the lateral parts are able to be pivoted about a central pin attaches in the center part.

4. The tool as claimed in claim 1, characterized in that the lateral parts are respectively able to be pivoted about their own pins attached in the center part.

5. The tool as claimed in claim 1, characterized in that ends of at least one piston and cylinder unit are in direct engagement with the lateral parts.

6. The tool as claimed in claim 1, characterized by a separate piston and cylinder unit for each lateral part, such piston and cylinder unit being pivotally mounted on the one hand on the lateral part one on the other hand on a suitable pivot point on the center part.

7. The tool as claimed in claim 1, characterized in that the locking elements consist of pins able to be operated directly.

8. The tool as claimed in claim 1, characterized in that the locking elements consist of catches which are pivotally mounted on the center part and which are able to be pivoted inwards towards corresponding projections on the lateral parts 9. The tool as claimed in claim 1, characterized in that one lateral part together with the lateral flank facing it of the center part constitutes a shear member, whereas the other lateral part together with the lateral flank facing it of the center part constitutes a concrete crusher.

10. The tool as claimed in claim 1, characterized in that one lateral part together with the lateral flank associated with it, of the center part constitutes a gripping tongs, whereas the other lateral part together with the lateral flank facing it constitutes an alligator shears.

11. The tool as claimed in claim 1, characterized in that one lateral part together with the lateral flank associated with it of the center part constitutes a concrete crusher in the form of a single tooth whereas the other lateral part together with the lateral flank facing it of the center part constitute a concrete pulverizer with a broad tooth.

12. The tool as claimed in claim 1, characterized in that one lateral part together with the lateral flank associated with it of the center part constitutes a vulture beak-shaped shears, whereas the other lateral part together with the lateral flank facing it of the center part constitute an alligator shear.

13. The tool as claimed in claim 1, characterized in that one lateral part together with the lateral flank associated with it of the center part constitutes a timber cleaver, whereas the other lateral part together with the lateral flank facing it of the center part constitute a timber cutter.

14. The tool as claimed in claim 1, characterized in that the locking elements consist of pins able to be operated by means of bell crank means hydraulically.

15. The tool as claimed in claim 1, characterized in that the locking elements consist of pins able to be operated by means of bell crank means electrically.

16. A tool for use with implements and having different functional working ranges with which respectively different working operations can be performed, characterized by:
   a center part, whose lateral flanks respectively constitute the one part of the working tool,
   two lateral parts pivotally mounted on the center part and which respectively constitute the other parts of the working tool,
   at least one piston and cylinder unit for pivoting the lateral parts in relation to the center part, and
   locking elements, by means of which one lateral part may be locked in relation to the center part,
   said locking elements consisting of catches which are pivotally mounted on said center part and which are able to be pivoted inwards towards corresponding projections on said lateral parts.

17. A tool for use with implements and having different functional working ranges with which respectively different working operations can be performed, characterized by:
   a center part, whose lateral flanks respectively constitute the one part of the working tool,
   two lateral parts pivotally mounted on the center part and which respectively constitute the other parts of the working tool,
   at least one piston and cylinder unit for pivoting the lateral parts in relation to the center part, and
   locking elements, by means of which one lateral part may be locked in relation to the center part,
   one of said lateral parts, together with the lateral flank associated with it of the center part, constituting a concrete crusher in the form of a single tooth and the other of said lateral parts, together with the lateral flank facing it of the center part, constituting a concrete pulverizer with a broad tooth.

* * * * *